United States Patent
Kim et al.

(10) Patent No.: US 8,547,496 B2
(45) Date of Patent: Oct. 1, 2013

(54) LIQUID CRYSTAL DISPLAY DEVICE HAVING A GROOVE ACCOMMODATING EXCESS RESIN

(75) Inventors: Jeung-Soo Kim, Yongin (KR); Sang-Hee Lee, Yongin (KR); Jeong-Ho Hwang, Yongin (KR); Seung-Mock Ro, Yongin (KR); Kyu-Han Bae, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 265 days.

(21) Appl. No.: 12/915,574

(22) Filed: Oct. 29, 2010

(65) Prior Publication Data

US 2011/0187956 A1  Aug. 4, 2011

(30) Foreign Application Priority Data

Feb. 2, 2010 (KR) .................. 10-2010-0009588

(51) Int. Cl.
*G02F 1/1333* (2006.01)
(52) U.S. Cl.
USPC ..................................... 349/58; 361/679.3
(58) Field of Classification Search
USPC ................. 349/58; 361/679.3; 455/575.1
See application file for complete search history.

(56) References Cited

U.S. PATENT DOCUMENTS

| | | | |
|---|---|---|---|
| 2001/0002145 A1* | 5/2001 | Lee et al. | 349/58 |
| 2003/0011736 A1* | 1/2003 | Ha et al. | 349/149 |
| 2007/0115401 A1* | 5/2007 | Tsubokura et al. | 349/58 |
| 2009/0256796 A1 | 10/2009 | Jang et al. | |

FOREIGN PATENT DOCUMENTS

| | | |
|---|---|---|
| JP | 08179288 | 7/1996 |
| KR | 10-0320664 B1 | 1/2002 |
| KR | 10-2005-0041106 A | 5/2005 |
| KR | 10-0648222 | 11/2006 |
| KR | 10-2008-0077810 | 8/2008 |
| KR | 10-0889532 | 3/2009 |
| KR | 10-2009-0109316 | 10/2009 |
| WO | WO 2008143418 A1 * | 11/2008 |

OTHER PUBLICATIONS

English Abstract of Korean Patent Publication No. 10-2006-0033470.

* cited by examiner

*Primary Examiner* — Michael Caley
(74) *Attorney, Agent, or Firm* — Robert E. Bushnell, Esq.

(57) ABSTRACT

A liquid crystal display (LCD) including: a display panel; a backlight unit to radiate light to the display panel; a mold frame surrounding the backlight unit and supporting the display panel; a housing to receive the display panel, backlight unit, and mold frame; and a resin unit provided between the display panel and the housing. A receiving groove is formed below the resin unit, by sloped surfaces of the mold frame and side walls of the housing.

12 Claims, 3 Drawing Sheets

LIQUID CRYSTAL DISPLAY DEVICE HAVING A GROOVE ACCOMMODATING EXCESS RESIN

RELATED APPLICATION

This application claims the benefit of Korean Patent Application No. 10-2010-0009588, filed on Feb. 2, 2010, in the Korean Intellectual Property Office, the disclosure of which is incorporated herein by reference.

BACKGROUND

1. Field

The described technology relates generally to a slim liquid crystal display (LCD).

2. Description of the Related Art

A liquid crystal display (LCD) is a display device that displays images using a liquid crystal layer that operates as a shutter. A conventional liquid crystal display (LCD) includes a display panel including a liquid crystal layer, a backlight unit to radiate light to the display panel, and a housing to receive the display panel and the backlight unit.

Recently, a slim liquid crystal display (LCD), of which edges of a display panel face a housing, has been developed, so as to reduce an area between an image display area of the display panel and the housing. However, since the edges of the display panel directly face the housing, when the housing is formed with a conductive material such as metal, a short circuit occurs between the display panel and the housing, which generates image defects.

Also, since the edges of the display panel face the housing, when an impact is applied to the housing, one of the edges of the display panel impacts the housing. As a result, in the display panel may be broken. Further, the display panel is affixed to the backlight unit using an adhesive, such as an adhesive tape, and when the adhesive ingredients of the tape are deteriorated, the display panel may become separated from the backlight unit.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a slim liquid crystal display (LCD), wherein a short circuit is prevented between a display panel and a housing.

Aspects of the present invention provide a slim liquid crystal display (LCD) that can prevent damage to a display panel by minimizing impacts between a display panel and a housing.

An exemplary embodiment of the present disclosure provides a liquid crystal display including: a display panel; a backlight unit to radiate light to the display panel; a mold frame surrounding the backlight unit and supporting the display panel; a housing to receive the display panel, the backlight unit, and the mold frame; and a resin unit provided between the display panel and the housing, wherein a receiving groove is formed between the mold frame and the housing.

According to various embodiments, the housing includes a bottom plate and side walls extend from the bottom plate and face edges of the display panel. The resin unit is provided between the edges of the display panel and the side walls of the housing.

According to various embodiments, the resin unit directly contacts the display panel and the side walls.

According to various embodiments, the mold frame includes sloped surfaces facing the resin unit and forming acute angles with respect to the corresponding side walls. The side walls and the sloped surfaces at least partially define the receiving groove.

According to various embodiments, the mold frame has a support surface that extends from the sloped surfaces, to support the display panel.

According to various embodiments, the resin unit includes at least one resin selected from urethane acrylate, acrylate, and silicon.

According to an exemplary embodiment, since a resin unit is provided between a display panel and a housing, a slim liquid crystal display (LCD) that prevents a short circuit between wiring of a display panel and a housing, is provided.

According to various embodiments, a slim liquid crystal display (LCD) is provided that prevents a display panel from being broken, by including a resin unit between the display panel and a housing, to minimize the effect of impacts to the housing.

According to various embodiments, a slim liquid crystal display (LCD) is provided, including display panel by providing a resin unit to affix edges of a display panel to a housing.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings, of which.

DETAILED DESCRIPTION

Figure 1:
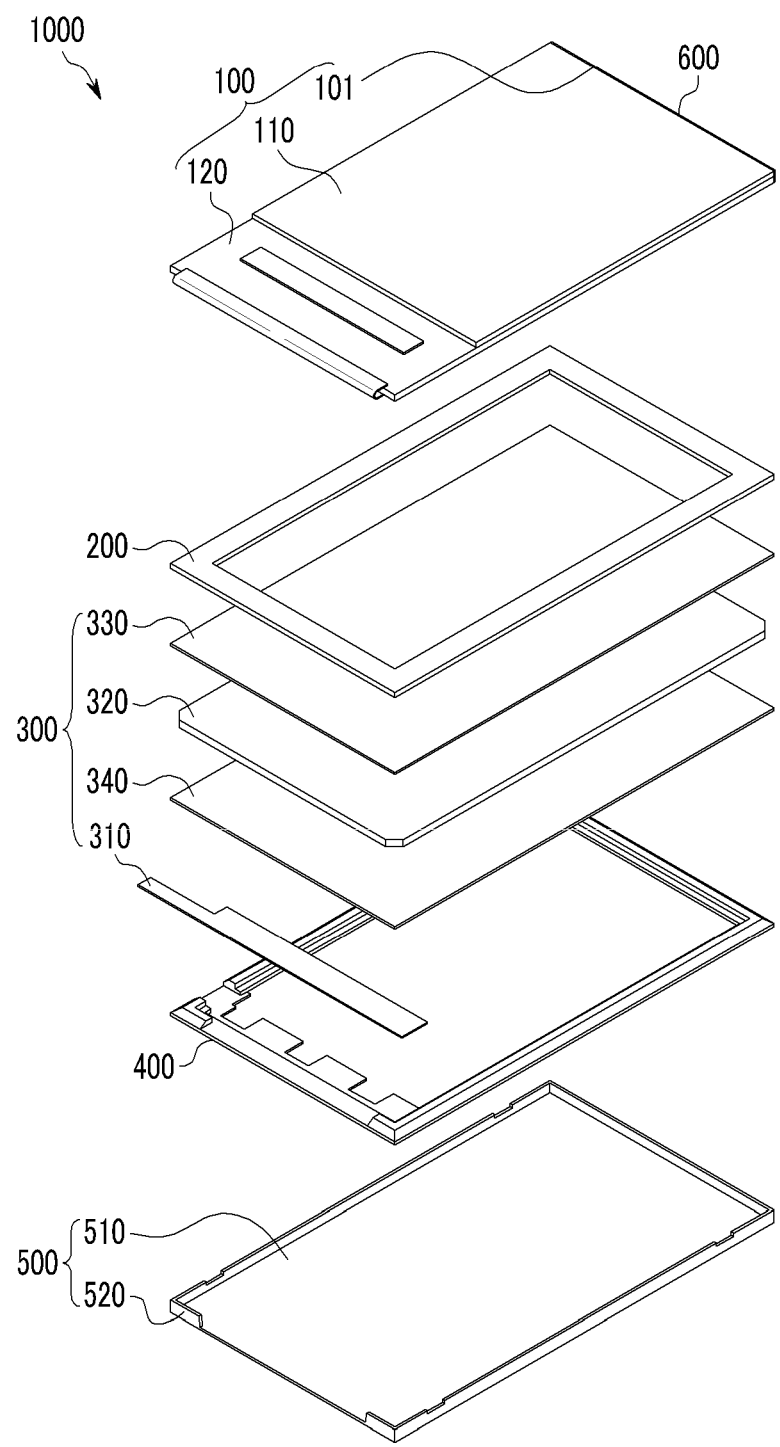
FIG. 1 shows an exploded perspective view of a liquid crystal display (LCD), according to an exemplary embodiment.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of present invention, by referring to the figures. As those skilled in the art would realize, the described embodiments may be modified in various different ways, all without departing from the spirit or scope of the present invention.

In the drawings, the thickness of layers, films, panels, regions, etc., may be exaggerated for clarity. It will be understood that when an element such as a layer, film, region, or substrate is referred to as being disposed "on" another element, it can be disposed directly on the other element, or may be indirectly disposed on the other element, with intervening elements disposed therebetween.

In addition, unless explicitly described to the contrary, the word "comprise" and variations such as "comprises" or "comprising" will be understood to imply the inclusion of stated elements but not the exclusion of any other elements. Throughout this specification, it is understood that the term "on" and similar terms are used generally and are not necessarily related to a gravitational reference.

A liquid crystal display (LCD) 1000, according to an exemplary embodiment will now be described with reference to FIGS. 1 to 3. As shown in FIG. 1, the liquid crystal display (LCD) 1000 includes a display panel 100, an adhesive sheet 200, a backlight unit 300, a mold frame 400, a housing 500, a resin unit 600, and a receiving groove 700 (shown in FIG. 3).

The display panel 100 includes a first substrate 110 and an opposing second substrate 120. A liquid crystal layer (not shown) is provided between the first substrate 110 and the second substrate 120. Wiring is formed on at least one of the first substrate 110 and the second substrate 120. Liquid crystal included in a liquid crystal layer is manipulated using a magnetic field generated by the wiring, such that the amount of light irradiated from the backlight unit 300 to the display panel 100 is controlled, to thereby project an image through the display panel 100. A polarizing plate (not shown) can be attached to at least one of a front surface and a rear surface of the display panel 100, to change an optical axis of the light that is radiated or from the display panel 100.

The adhesive sheet 200 is provided between the display panel 100 and the backlight unit 300. The adhesive sheet 200 adheres the display panel 100 to the backlight unit 300. The adhesive sheet 200 is also provided between the display panel 100 and the mold frame 400. That is, the adhesive sheet 200 adheres the display panel 100 to the backlight unit 300 and the mold frame 400.

The backlight unit 300 radiates light to the display panel 100. The backlight unit 300 includes a light emitter 310, a light guide plate 320, an optical sheet 330, and a reflective sheet 340.

The light emitter 310 generates light, and is provided at an edge of the light guide plate 320. The light generated by the light emitter 310 is radiated to the light guide plate 320. The light guide plate 320 then radiates the light toward the display panel 100. The light emitter 310 can be a point light source or a linear light source. The light radiated by the light emitter 310 is changed into a surface light source, by the light guide plate 320.

The light guide plate 320 is provided between the optical sheet 330 and the reflective sheet 340. The light guide plate 320 changes the light radiated by the light emitter 310 into a surface light source, and radiates the same to the display panel 100.

The optical sheet 330 improves display quality of the image realized by the display panel 100, by changing the light radiated by the light guide plate 320. The optical sheet 330 may include a diffusion sheet, a prism sheet, and a protection sheet.

The reflective sheet 340 is provided between the light guide plate 320 and the housing 500. The reflective sheet 340 reflects the light that is radiated thereto, through the light guide plate 320, so that the light passes through the light guide plate 320 and is radiated to the display panel 100.

Figure 2:
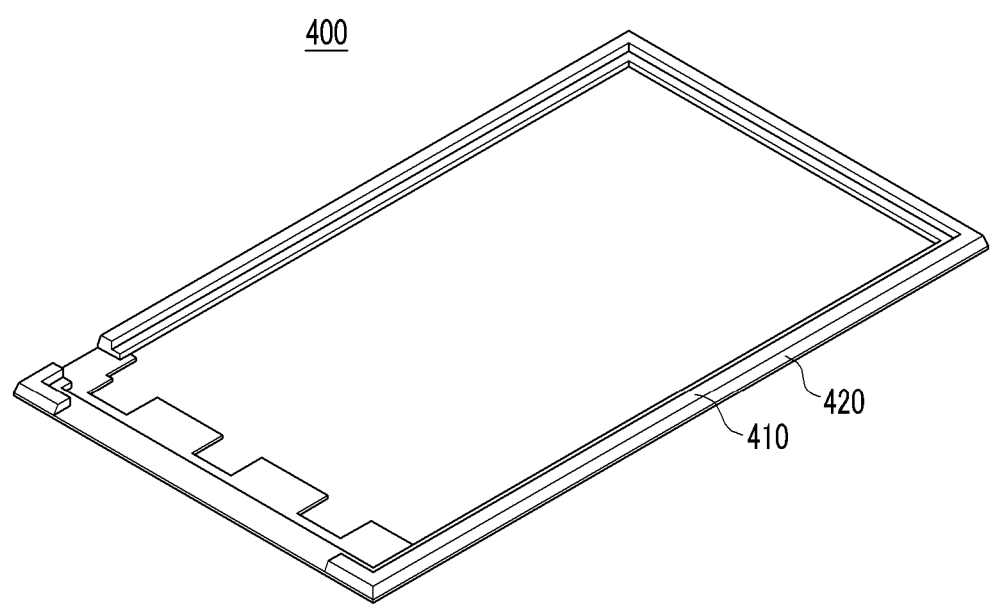
FIG. 2 shows a perspective view of a mold frame shown in FIG. 1.
Figure 3:
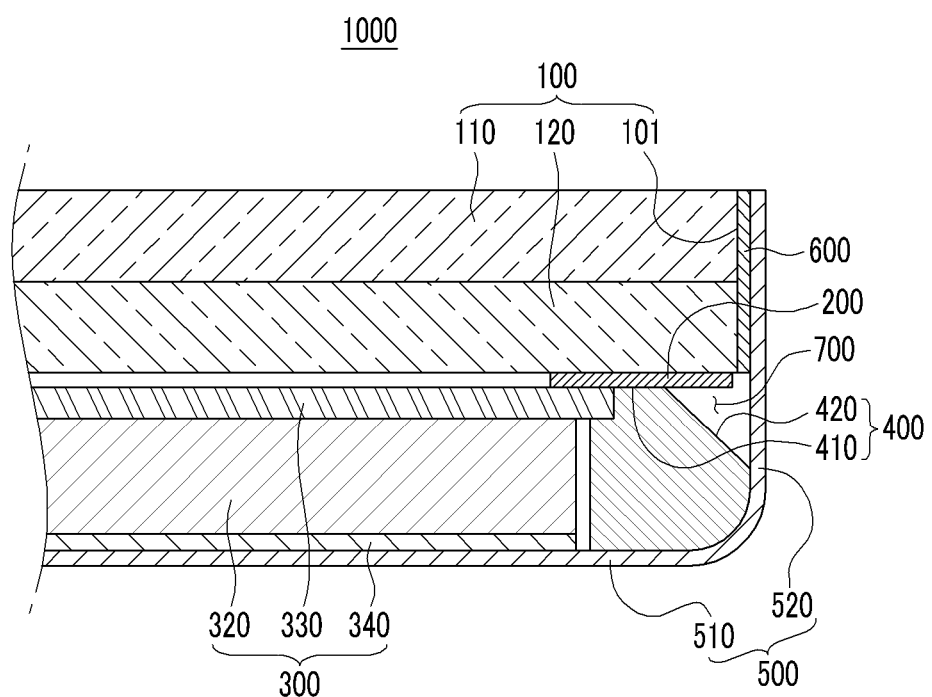
FIG. 3 shows a partial cross-sectional view of a liquid crystal display (LCD), with reference to a resin unit shown in FIG. 1.

FIG. 2 shows a perspective view of the mold frame 400 shown in FIG. 1. FIG. 3 shows a partial cross-sectional view of the liquid crystal display (LCD) 1000. As shown in FIGS. 2 and 3, the mold frame 400 surrounds edges of the backlight unit 300, and includes a support surface 410 and sloped surfaces 420. The support surface 410 faces and supports the display panel 100. The adhesive sheet 200 is disposed between the support surface 410 and the display panel 100, to adhere the same together.

The housing 500 receives display panel 100, the backlight unit 300, and the mold frame 400. The housing 500 includes a bottom plate 510 and side walls 520. The side walls 520 extend from the bottom plate 510, toward the display panel 100. The reflective sheet 340 is disposed on the bottom plate 510.

The sloped surfaces 420 of the mold frame 400 extend at and angle from the support surface 410, toward the housing 500. In particular, the sloped surfaces 420 each form an acute angle, with respect to an adjacent one of the side walls 520. The sloped surfaces 420 generally face the resin unit 600.

The side walls 520 extend from the bottom plate 510 and face corresponding edges 101 of the display panel 100, with the resin unit 600 disposed therebetween. The sloped surfaces 420 and the side walls 520 form a receiving groove 700.

The resin unit 600 includes a resin material, for example, urethane acrylate, acrylate, silicon, or a combination thereof. The resin unit 600 is provided between the edges 101 of the display panel 100 and the side walls 520 of the housing 500. The resin unit 600 insulates the display panel 100 from the housing 500. That is, the resin unit 600 insulates the area between the display panel 100 and the housing 500. The resin unit 600 affixes the display panel 100 to the side walls 520. The resin unit 600 has a high elasticity (low brittleness) and minimizes the transfer of impact energy between the housing 500 and the display panel 100.

In the liquid crystal display (LCD) 1000, the resin unit 600 is provided on the edges 101 of the display panel 100, and may completely or incompletely surround the display panel 100. Accordingly, since the edges 101 of the display panel 100 face the housing 500, with the resin unit 600 therebetween, the edges 101 may have a reduced thickness, and the generation of a short circuit between a wiring of the display panel 100 and the housing 500 may be prevented.

Also, since the resin unit 600 has a high elasticity, interference between the display panel 100 and the housing 500 is minimized, and the display panel 100 is prevented from being broken by an external impact. In addition, since the resin unit 600 is provided between the display panel 100 and the side walls 520, it firmly affixes the display panel 100 to the housing 500.

The receiving groove 700 is disposed below the resin unit 600 and has a sunken groove shape. As such, when forming the resin unit 600 by injecting a resin between the display panel 100 and the housing 500, the receiving groove 700 receives excess resin that flows between the edges 101 of the display panel 100 and the side walls 520 of the housing 500. Therefore, the receiving groove 700 channels the excess resin away from the backlight unit 300, during the formation of the resin unit 600.

In detail, if there is no receiving groove 700, the excess resin may flow between the edge 101 of the display panel 100 and the side wall 520, and contact the backlight unit 300. As such, the excess resin may interfere with the emission of light from the backlight unit 300, thereby generating defects in an image formed by the display panel 100.

However, in the liquid crystal display (LCD) 1000, the receiving groove 700 has a triangular widthwise, cross-section, due to the sloped surfaces 420. Thus, any excess resin is channeled away form the backlight unit 300, into the bottom of the receiving groove 700. According to some aspects, the receiving groove 700 may be polygonal, circular, or oval, in widthwise cross-section.

As described, in the liquid crystal display (LCD) 1000, the resin unit 600 is disposed between the edges 101 of the display panel 100 and the walls 520 of the housing 500, such that the edges 101 of the display panel 100 may be reduced in size. Thus, the inclusion of the resin unit 600 prevents a short circuit between the display panel 100 and the housing 500, prevents breakage of the display panel 100 due to external impacts, and firmly affixes the display panel 100 to the housing 500. Also, since the liquid crystal display (LCD) 1000 includes the receiving groove 700, excess resin is prevented from generating image defects.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A liquid crystal display device, comprising:
   a display panel, said display panel comprising an exterior surface, an interior surface opposite to the exterior surface, and a side surface connecting the exterior surface and the interior surface;
   a backlight unit radiating light to the display panel via the interior surface;
   a mold frame surrounding the backlight unit and supporting the display panel;
   a housing accommodating the display panel, the backlight unit, and the mold frame, said housing comprising a side wall facing the side surface of the display panel;
   a resin unit provided between the side surface of the display panel and the side wall of the housing, attaching the display panel to the housing; and
   a receiving groove formed between the mold frame and the housing, and directly connected to the resin unit.

2. The liquid crystal display device of claim 1, the housing including a bottom plate and the side wall that extends from the bottom plate.

3. The liquid crystal display device of claim 1, wherein the resin unit directly contacts the display panel and the side wall.

4. The liquid crystal display device of claim 1, wherein the mold frame has:
   a support surface upon which the display panel is disposed;
   a sloped surface that extends from the support surface to the side wall, and
   the side wall of the housing and the sloped surface at least partially define the receiving groove.

5. The liquid crystal display device of claim 4, wherein an adhesive sheet is disposed between the support surface and the display panel, and between the backlight unit and the display panel.

6. The liquid crystal display device of claim 1, wherein the resin unit comprises at least one material selected from urethane acrylate, acrylate, and silicon.

7. A liquid crystal display device, comprising:
   a display panel;
   a backlight unit to radiate light to the display panel;
   a mold frame surrounding the backlight unit, having a support surface that supports the display panel, and sloped surfaces that extend from the support surfaces;
   a housing having a bottom plate and side walls, to receive the display panel, the backlight unit, and the mold frame;
   a resin unit provided between edges of the display panel and the side walls, attaching the display panel to the housing; and
   a receiving groove partially defined by the sloped surfaces of the mold frame and the sidewalls of the housing to contain an excess amount of a resin used to form the resin unit, and directly connected to the resin unit.

8. The liquid crystal display device of claim 7, wherein the receiving groove has a V-shaped, widthwise cross-section.

9. The liquid crystal display device of claim 7, wherein the resin unit has a higher elasticity than the display panel, so as to protect the display panel from impacts applied to the housing.

10. A liquid crystal display device, comprising:
    a display panel, said display panel comprising an exterior surface, an interior surface opposite to the exterior surface, and a side surface connecting the exterior surface and the interior surface;
    a backlight unit radiating light to the display panel via the interior surface;
    a mold frame surrounding the backlight unit and supporting the display panel;
    a housing accommodating the display panel, the backlight unit, and the mold frame, said housing comprising a side wall facing the side surface of the display panel; and
    a resin unit molded between the side surface of the display panel and the side wall of the housing, attaching the display panel to the housing; and
    a receiving groove formed between the mold frame and the housing, and directly connected to the resin unit.

11. The liquid crystal display device of claim 10, further comprised of a groove disposed to receive resin residual from molding of the resin unit, formed between the mold frame and the housing.

12. The liquid crystal display device of claim 11, wherein the receiving groove exhibits a V-shaped, widthwise cross-section.

* * * * *